(12) United States Patent
Izquierdo Civera et al.

(10) Patent No.: US 12,319,404 B2
(45) Date of Patent: Jun. 3, 2025

(54) AIRCRAFT CONTROL SYSTEM

(71) Applicant: AIRBUS OPERATIONS LIMITED, Bristol (GB)

(72) Inventors: Fernando Izquierdo Civera, Bristol (GB); Alex Robert Piddock, Bristol (GB); Mark Johnson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 189 days.

(21) Appl. No.: 18/100,316

(22) Filed: Jan. 23, 2023

(65) Prior Publication Data

US 2023/0234699 A1 Jul. 27, 2023

(30) Foreign Application Priority Data

Jan. 24, 2022 (GB) .................................. 2200875

(51) Int. Cl.
*B64C 19/02* (2006.01)
*B64C 13/16* (2006.01)

(52) U.S. Cl.
CPC .............. *B64C 19/02* (2013.01); *B64C 13/16* (2013.01)

(58) Field of Classification Search
CPC ................................ B64C 19/02; B64C 13/16
USPC .......................................................... 701/3
See application file for complete search history.

(56) References Cited

U.S. PATENT DOCUMENTS

| | | | | |
|---|---|---|---|---|
| 6,664,656 B2 * | 12/2003 | Bernier | ................... | H02G 3/00 307/64 |
| 6,704,624 B2 * | 3/2004 | Ortega | ................. | G05D 1/0077 244/175 |
| 11,749,122 B1 * | 9/2023 | Kimchi | ................ | G08G 5/0039 701/3 |
| 11,932,269 B2 * | 3/2024 | Ikegashira | ............ | G06F 21/554 |
| 2009/0187293 A1 | 7/2009 | Trotter et al. | | |

(Continued)

FOREIGN PATENT DOCUMENTS

| CN | 103407576 | 11/2013 |
|---|---|---|
| CN | 112 407 257 | 2/2021 |

(Continued)

OTHER PUBLICATIONS

English Translation of JP-2006142869-A, obtained via EspaceNet Sep. 2024. (Year: 2024).*

(Continued)

*Primary Examiner* — Krishnan Ramesh
(74) *Attorney, Agent, or Firm* — Nixon & Vanderhye P.C.

(57) ABSTRACT

An aircraft control system 100 including a control assembly 110 having control units, including a first control unit 130 for controlling actuation of the aircraft component during a first time period, using electrical resource 512 from a first electrical resource device 510, and a second control unit 140 for controlling actuation of the aircraft component during a second time period, and a switch mechanism 120 for switching control of the actuation of the aircraft component between the first and second control units, wherein the switch mechanism has a first electrical resource device status input 513 for indicating the status of the first electrical resource device 510 and wherein, the switch mechanism is configured to switch control between the first 130 and second 140 control units based on the first electrical resource device status input 513.

19 Claims, 5 Drawing Sheets

(56) References Cited

U.S. PATENT DOCUMENTS

| | | | | |
|---|---|---|---|---|
| 2011/0066305 A1* | 3/2011 | Lin | ............... | B64C 19/00 |
| | | | | 701/3 |
| 2016/0018793 A1* | 1/2016 | Becker | ............... | G05B 9/03 |
| | | | | 701/3 |
| 2017/0277151 A1 | 9/2017 | Liu et al. | | |

FOREIGN PATENT DOCUMENTS

| | | |
|---|---|---|
| CN | 214397207 | 10/2021 |
| GB | 2562027 | 11/2018 |
| JP | 2006 142869 | 6/2006 |

OTHER PUBLICATIONS

Combined Search and Examination Report for GB Application No. 2200875.9 dated Jul. 19, 2022, 6 pages.
European Search Report cited in EP 23152827.4 mailed May 26, 2023, 9 pages.

* cited by examiner

AIRCRAFT CONTROL SYSTEM

RELATED APPLICATION

This application incorporates by reference in its entirety and claims priority to United Kingdom patent application GB 2200875.9, filed Jan. 24, 2022.

TECHNICAL FIELD

The present invention relates to an aircraft control system, an aircraft, aircraft assembly and a method of controlling an aircraft component of an aircraft.

BACKGROUND

Modern aircraft generally comprise a number of control systems for controlling actuation of various aircraft components, such as landing gear bay doors, landing gear extension/retraction, a braking system or a steering system. An example control system comprises two Landing Gear Control and Interface Units (LGCIU). Another example control system comprises two Braking and Steering Control Units (BSCU).

These systems and units rely on electrical resource, e.g., electrical power, from external electrical devices. For example, a first LGCIU may use electrical power provided by a first generator coupled to a first aircraft engine. The second LGCIU may use electrical power provided by a second generator coupled to a second aircraft engine. There is a switch mechanism which switches control between the first and second LGCIUs. It does this periodically in an alternate manner such that, for example, the first LGCIU controls the LG until the next selection of "landing gear UP" and then the second first LGCIU takes controls until the next selection of "landing gear UP" and so on.

If one of the engines suffers a fault, it may no longer provide power to the relevant LGCIU. If this happens, and if control of the LG at that time is being provided by the affected LGCIU, there is a delay of 200 ms while the power is interrupted and then a 500 ms delay while the LGCIU restarts. Hence, there may be a delay of up to 700 ms between a pilot commanding an actuation of the LG and the actuation actually occurring.

This means that actuation of the LG (or other aircraft component, for example braking or steering) may not always be as responsive as desired.

A way of dealing with this issue is to provide a secondary/additional resource (e.g. electrical power supply) for each of the two LGCIUs. Similarly, for a different system, such as a braking or steering system, a secondary/additional electrical supply for each of the two BSCUs could be provided. However, this adds additional weight to the aircraft.

The present invention seeks to mitigate the above-mentioned problems. Alternatively or additionally, the present invention seeks to provide an improved aircraft control system.

SUMMARY

A first aspect of the present invention provides an aircraft control system for controlling actuation of an aircraft component, the system comprising a control assembly having control units, including a first control unit for controlling actuation of the aircraft component during a first time period, using electrical resource from a first electrical resource device, and a second control unit for controlling actuation of the aircraft component during a second time period, and a switch mechanism for switching control of the actuation of the aircraft component between the first and second control units, wherein the switch mechanism has a first electrical resource device status input for indicating the status of the first electrical resource device and wherein, the switch mechanism is configured to switch control between the first and second control units based on the first electrical resource device status input.

The first electrical resource device status input of the switch mechanism comprises an input (directly or indirectly) from the first electrical resource device that is independent from the electrical resource of the first electrical resource device used by the first control unit to control actuation of the aircraft component.

The first electrical resource device may be a device external to the aircraft control system. It may be external to a control system or control assembly comprising the switch mechanism and first and second control units.

Such a control system is capable of switching control from a control unit (e.g. the first control unit) that may not have a suitable electrical resource (e.g. from the first electrical resource device), to a different control unit (e.g. the second control unit). This enables any potential disruption from a lack of electrical resource to be minimised and for the control of the actuation of the aircraft component to be uninterrupted. It is able to provide this functionality without the need for a separate electrical resource storage unit (e.g. secondary electrical power storage) for the first control unit and hence at a lower weight.

For example, the switch mechanism may switch control from the first control unit to the second control unit, based on the first electrical resource device status input. This switching may be based on a "fault" indication of the first electrical resource device. As another example, the switch mechanism may switch control from the second control unit to the first control unit, based on the first electrical resource device status input. This switching may be based on a "no fault" indication of the first electrical resource device.

Importantly, the electrical resource device status input provides an indication of the status of a device that is external to the control system. The control system is capable of actively changing its control mode (e.g. from one control unit to another). That change of mode is based on the status of the electrical resource device.

For example, the electrical resource device may be a generator coupled to an engine, providing electrical power to the first control unit. The electrical resource device status input provides an indication of whether or not the engine has a failure or not. The switch mechanism may switch control from the first control unit to the second control unit upon receiving a failure indication of the engine.

The control assembly may comprise any suitable number of control units. For example, it may comprise four control units.

The first time period and second time period may occur, for example alternately (for two control units) or sequentially (for more than two control units and corresponding time periods), in normal operation of the control system and electrical resource device(s). For example, the switch mechanism, or a further switch mechanism may switch control of the actuation of the aircraft component between the first and second (or further) control units, during normal operation.

The control system may be for controlling actuation of a landing gear system or a braking system or a steering system.

For example, the control system may be for controlling actuation of landing gear bay doors and/or landing gear extension/retraction. The control system may be a Landing Gear Control and Interface Unit (LGCIU). As an alternative example, the control system may be for controlling a braking and/or steering system. The control system may be a Braking and Steering Control Unit (BSCU).

The second control unit may control actuation of the aircraft component using electrical resource from a second electrical resource device and wherein the switch mechanism has a second electrical resource device status input for indicating the status of the second electrical resource device and wherein, the switch mechanism is configured to switch control between the first and second control units based on the second electrical resource device status input.

The second electrical resource device status input of the switch mechanism comprises an input (directly or indirectly) from the second electrical resource device that is independent from the electrical resource of the second electrical resource device used by the second control unit to control actuation of the aircraft component.

The second electrical resource device may be a device external to the aircraft control system. It may be external to a control system or control assembly comprising the switch mechanism and first and second control units.

For example, the switch mechanism may switch control from the second control unit to the first control unit, based on the second electrical resource device status input. This switching may be based on a "fault" indication of the second electrical resource device. As another example, the switch mechanism may switch control from the first control unit to the second control unit, based on the second electrical resource device status input. This switching may be based on a "no fault" indication of the second electrical resource device. The switch mechanism may be configured to switch control between the first and second control units based on the first and second electrical resource device status inputs.

The first control unit may be for controlling actuation of the aircraft component using direct electrical resource from the first electrical resource device.

For example, the first electrical resource device may be a generator (for example, coupled to an aircraft engine) supplying electrical power to the first control unit, to power the first control unit.

Similarly, alternately or additionally, the second control unit is for controlling actuation of the aircraft component using direct electrical resource from the second electrical resource device. For example, the second electrical resource device may be a generator (for example, coupled to an aircraft engine) supplying electrical power to the second control unit, to power the second control unit.

In use, the supply of electrical resource to the first and/or second control unit may include supply via an intermediate system, such as an (alternate current) electrical bus, for example. However, the supply of electrical resource is to the control unit(s) themselves and so is a direct supply. The intermediate system may provide a delay between a failure of the relevant electrical resource device and the resultant lack of sufficient electrical resource at the relevant control unit.

Alternatively, the first control unit is for controlling actuation of the aircraft component using indirect electrical resource from the first electrical resource device.

For example, the first electrical resource device may be an electric supply supplying electrical power to the aircraft component to actuate it, based on control signals from the first control unit.

Similarly, alternately or additionally, the second control unit is for controlling actuation of the aircraft component using indirect electrical resource from the second electrical resource device. For example, the second electrical resource device may be an electric supply supplying electrical power to the aircraft component to actuate it, based on control signals from the second control unit.

The first control unit may be for controlling actuation of the aircraft component using electrical power from the first electrical resource device.

For example, the first electrical resource device may be a generator (for example, coupled to an aircraft engine).

Similarly, alternately or additionally, the second control unit is for controlling actuation of the aircraft component using electrical power from the second electrical resource device. For example, the second electrical resource device may be a generator (for example, coupled to an aircraft engine).

The first electrical resource device status input may comprise a "fault" or a "no fault" indication.

In other words, the input is an indication of whether there is a fault or not. This may be based on whether or not the first electrical resource device is able to reliably provide the required electrical resource to enable control of the aircraft component. This may be based on an expectation that the required electrical resource will soon become unavailable.

Similarly, alternately or additionally, the second electrical resource device status input comprises a "fault" or a "no fault" indication. In other words, the input is an indication of whether there is a fault or not. This may be based on whether or not the second electrical resource device is able to reliably provide the required electrical resource to enable control of the aircraft component. This may be based on an expectation that the required electrical resource will soon become unavailable.

In other words, the "fault" indication is based on an expectation that the required electrical resource will soon become unavailable. Hence, the switch mechanism can act to determine which control unit should control the actuation, prior to a loss of electrical resource. The switch mechanism does not wait until there is a loss of electrical resource.

For example, where the first (or second) electrical resource device is a generator, a "fault" indication of the first (or second) electrical resource device input may be provided when a shaft speed of an engine coupled to the generator drops below a threshold speed. This threshold speed may be 20% lower than the speed of the corresponding shaft of a different engine (for example, of the other (first or second) electrical resource device). This threshold speed is above the level at which power is no longer able to be generated by the generator coupled to the engine. However, it indicates that there has been an engine failure and that the engine will soon not be able to provide power (via the generator). For example, this may occur 5 seconds prior to the shaft speed dropping below the "power interrupt" level.

The switch mechanism may be part of the first control unit.

Hence, the first control unit may have active choice as to whether it has control of the actuation of the aircraft component, or not. For example, the first control unit may pass control over to the second control unit if it receives an indication of a fault with the first electrical resource device. As another example, the first control unit may request control from the second control unit if it receives an indication of a fault with the second electrical resource device.

There may be a second switch mechanism that is part of the second control unit.

Hence, the second control unit may have active choice as to whether it has control of the actuation of the aircraft component, or not.

The second switch mechanism may have a second electrical resource device status input for indicating the status of the second electrical resource device and wherein, the switch mechanism is configured to switch control between the first and second control units based on the second electrical resource device status input. The switch mechanism may have a first electrical resource device status input for indicating the status of the first electrical resource device and wherein, the switch mechanism is configured to switch control between the first and second control units based on the first electrical resource device status input.

For example, the second control unit may pass control over to the first control unit if it receives an indication of a fault with the second electrical resource device. As another example, the second control unit may request control from the first control unit if it receives an indication of a fault with the first electrical resource device.

The switch mechanism may additionally be configured to switch control between the first and second control units in a periodic manner.

For example, during a normal operation mode, this switching may be alternatively between two control units, at regular time intervals, or after a certain instruction is received. The switch mechanism may be configured to override this (periodic) switching during a back-up operation mode. That back-up operation mode may be triggered by a "fault" indication from either the first or second electrical resource device status inputs.

Similarly, alternatively or additionally, the second switch mechanism may be additionally configured to switch control between the first and second control units in a periodic manner, or after a certain instruction is received. For example, during a normal operation mode, this switching may be alternatively between two control units, at regular time intervals. The second switch mechanism may be configured to override this (periodic) switching during a back-up operation mode. That back-up operation mode may be triggered by a "fault" indication from either the first or second electrical resource device status inputs.

According to a second aspect of the invention, there is provided an aircraft or aircraft assembly comprising the aircraft control system as described above.

The aircraft or aircraft assembly may further comprise the aircraft component to be actuated and the first electrical resource device.

The aircraft or aircraft assembly may further comprise the second electrical resource device.

According to a third aspect of the invention, there is provided a method of controlling an aircraft component of an aircraft, the method comprising the steps of monitoring the status of a first electrical resource device, using the first control unit to control actuation of the aircraft component during a first time period, using electrical resource from the first electrical resource device, and based upon the status of the first electrical resource device, switching control of the actuation of the aircraft component to a second control unit.

The second control unit may control actuation of the aircraft component using electrical resource from a second electrical resource device.

The status of the first electrical resource device may comprise a "fault" or a "no fault" indication.

A "fault" indication may be provided prior to the electrical resource from the first electrical resource device becoming unavailable.

The method may include the step of switching control between the first and second control units in a periodic manner.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the invention will now be described, by way of example only, with reference to the accompanying drawings, in which.

DETAILED DESCRIPTION

Figure 1:
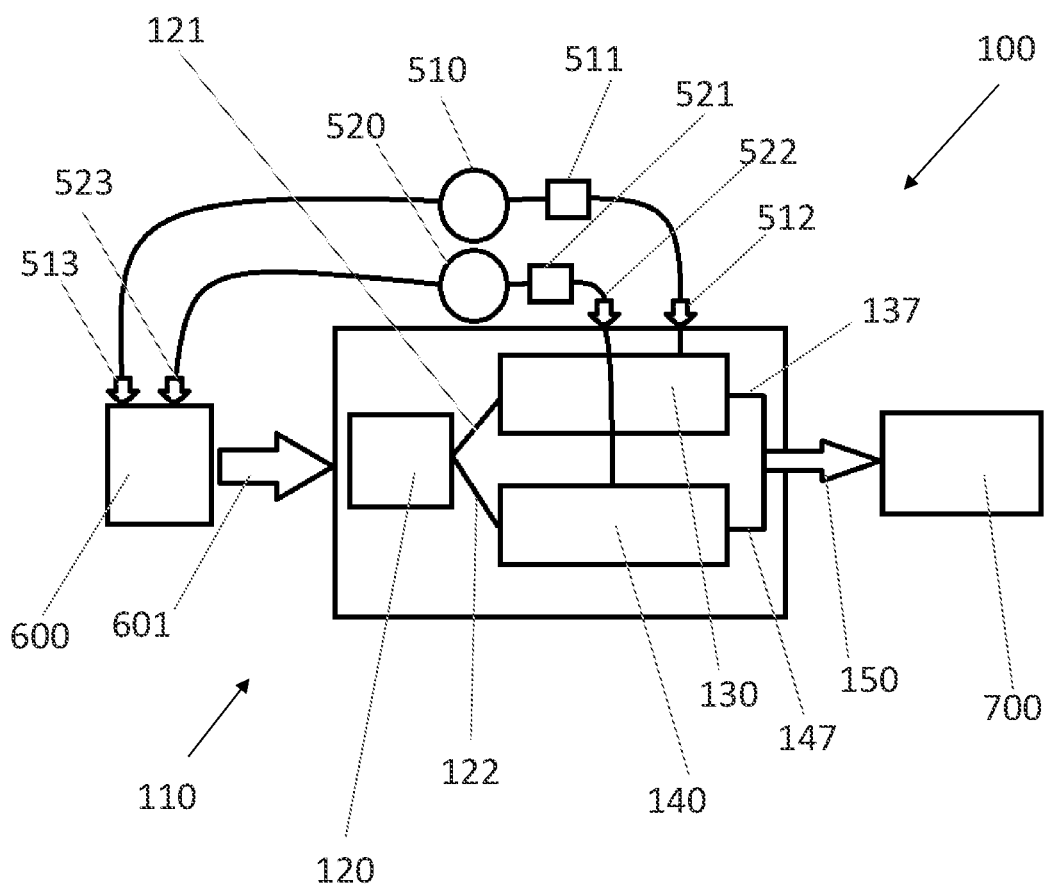
FIG. 1 shows a schematic diagram of an aircraft control system according to a first embodiment of the invention.

FIG. 1 shows a schematic diagram of an aircraft control system 100 according to a first embodiment of the invention. The control system 100 is for controlling actuating of a landing gear extension/retraction system 700, including door and landing gear actuation.

The control system 100 comprises a control assembly 110. The control assembly 110 comprises two control units; first control unit 130 and second control unit 140, called landing gear control interface units (LGCIUs).

The first control unit 130 is supplied with electrical power 511 from a first aircraft engine 510. This electrical power is provided via a generator (not shown) and an aircraft BUS 511. Similarly, the second control unit 140 is supplied with electrical power 522 from a second aircraft engine 520. This electrical power is provided via a generator (not shown) and a second aircraft BUS 521. In other words, the control units 130, 140 use a direct electrical resource, e.g., electrical power generated by a generator(s) driven by the engines 510, 520, to control the landing gear extension/retraction system 700.

The control assembly 110 also comprises a switching mechanism 120. This mechanism 120 sends signals 121, 122 to the first and second control units 130, 140 respectively, signalling to them if they are the control unit responsible of controlling actuating of the landing gear extension/retraction 700 during a certain time period. The signal is a "responsible" or "not responsible" indication. During a normal operation mode, the switching mechanism 120 does this by changing the responsible control unit periodically and alternately. How it does this during a contingency operation mode will be described later.

At any given time, the responsible control unit 130 or 140 outputs a control signal 137 or 147 respectively, and this is output as a landing gear extension/retraction control signal 150. This is communicated to the landing gear extension/retraction system 700 to actuate it, as required.

Both engines 510, 520 provide a signal 513, 523, respectively, indicating the measurement of a shaft speed of the engine. Here, the shaft is the first shaft (the shaft speed being "N1").

These shaft speeds are provided to a Flight Management and Guidance Envelope Computer (FMGEC) 600. The computer 600 then uses the signals 513, 523 to assess whether or not one of the engines has a fault. For example, here, if the N1 of one of the engines is less than 20% lower than the N1 of the other engine, it is considered to have a fault. If this is not the case, then the engines are considered to not have a fault. Importantly, when an N1 speed is 20% lower, the engine is still able to provide power (via the generator) to the relevant control unit for about 5 seconds.

The computer 600 outputs "fault" or "no fault" status of the two engines to the control assembly 110 through input 601. This is received by the switching mechanism 120 of the control assembly 110.

If the switching mechanism 120 receives a signal of a "fault" of one of the engines through input 601, it operates in contingency operation mode. In this mode, the switching mechanism will ensure that responsibility is switched from the relevant control unit (i.e. from first control unit 130, if the first engine 510 has a fault) to the other control unit. This switching takes 200 ms to 300 ms. It will also ensure that the regular periodic/alternate switching does not occur. In other words, at least until it receives a "no fault" indication of the relevant engine, the switching mechanism 120 will continue to instruct the other control unit to be responsible.

This enables there to be no interruption to the control, as the control is switched away from the affected control unit, prior to it actually losing power. Here, the control assembly 110 is actively controlling the switching logic, based on external faults (outside of the control assembly).

Figure 2:
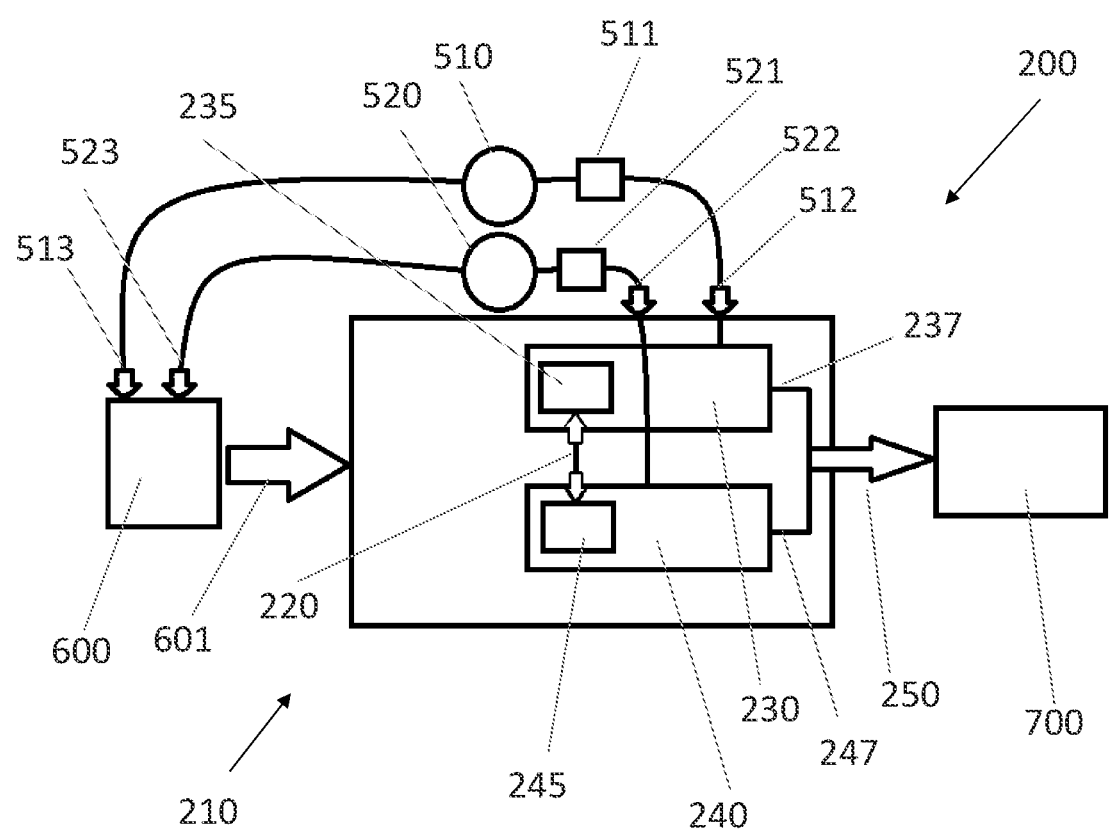
FIG. 2 shows a schematic diagram of an aircraft control system according to a second embodiment of the invention.

FIG. 2 shows a schematic diagram of an aircraft control system 200 according to a second embodiment of the invention. The control system 200 is similar to the control system 100 of the first embodiment and only the differences will be described below. The numbering used for like elements will use a "2" instead of a "1" at the beginning.

In this control system 200, instead of a single switching mechanism (120) located "communally" in the control assembly (110), there are two switching mechanism 235, 245, located in each of the two control units 230, 240 respectively. Both switching mechanisms receive signal 601 from the computer 600. These switching mechanisms 235, 245 communicate with each other through link 220 to ensure that one control unit is responsible at any given time.

Each switching mechanism 235, 245 operates independently of the other to assess an appropriate "responsible" and "not responsible" status for its control unit 230, 240. The communication link 220 is used to ensure that the statuses are consistent with each other (i.e. one control unit being responsible and one not being responsible at any given time).

Figure 3:
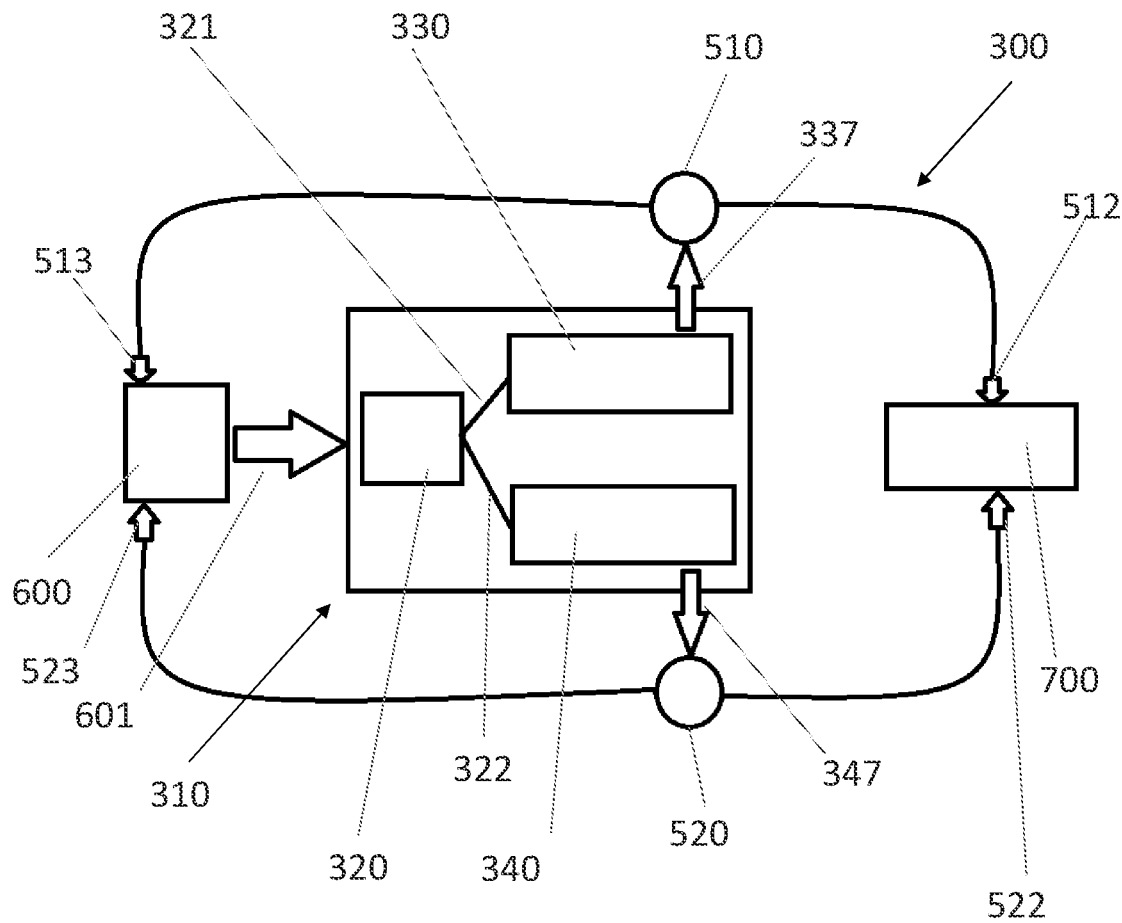
FIG. 3 shows a schematic diagram of an aircraft control system according to a third embodiment of the invention.

FIG. 3 shows a schematic diagram of an aircraft control system 300 according to a third embodiment of the invention. The control system 300 is similar to the control system 100 of the first embodiment and only the differences will be described below. The numbering used for like elements will use a "3" instead of a "1" at the beginning.

Here, the control system 300 uses electrical resource from the engines 510, 520 (via generators) in an indirect way. In other words, the control units 330, 340 control the landing gear extension/retraction system 700 and this uses the electrical resource. In other words, it is the landing gear extension/retraction system 700 that uses the electrical resource.

This is different to (and may be in addition to) the arrangements of the first and second embodiments where the electrical resource is used to provide power to the control units 330, 340 themselves. The control units 330, 340 (depending on which control unit is responsible at the relevant time) provide control signals 337, 347 to control the actuation of the landing gear extension/retraction system 700. This uses electrical resource (from engines 510, 520) to the landing gear extension/retraction system 700.

This is shown schematically in FIG. 3 by arrows 337, 347 sent to the engines/resource 510, 520 and by arrows 512, 522 to the landing gear extension/retraction system 700. Alternatively, the control signals 337, 347 may be sent to the landing gear extension/retraction system 700 and the landing gear extension/retraction system 700 effectively then takes electrical resource from the appropriate engine 510, 520 (via the generator).

Figure 4:
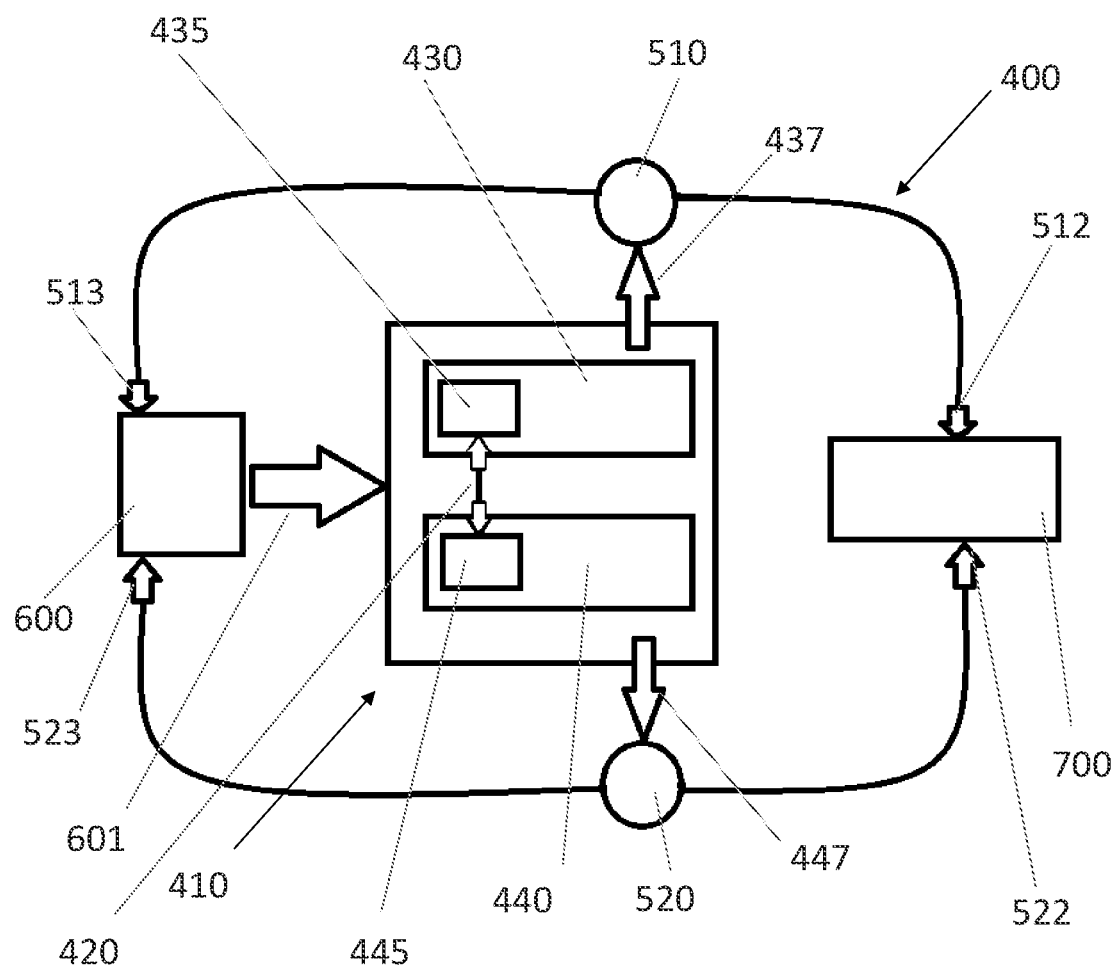
FIG. 4 shows a schematic diagram of an aircraft control system according to a fourth embodiment of the invention.

FIG. 4 shows a schematic diagram of an aircraft control system 400 according to a fourth embodiment of the invention. The control system 400 has similarities to the control systems 200, 300 of the second and third embodiments and the differences from the first embodiment will be described below. The numbering used for like elements will use a "4" instead of a "1", "2" or "3" at the beginning.

Here, in this control system 400, instead of a single switching mechanism (120) located "communally" in the control assembly (110), there are two switching mechanism 435, 445, located in each of the two control units 430, 440 respectively. Both switching mechanisms receive signal 601 from the computer 600. These switching mechanisms 435, 445 communicate with each other through link 420 to ensure that one control unit is responsible at any given time.

Each switching mechanism 435, 445 operates independently of the other to assess an appropriate "responsible" and "not responsible" status for its control unit 430, 440. The communication link 420 is used to ensure that the statuses are consistent with each other (i.e. one control unit being responsible and one not being responsible at any given time).

Here, the control system 400 uses electrical resource from the engines 510, 520 (via generators) in an indirect way. In other words, the control units 430, 440 control the landing gear extension/retraction system 700 and this uses the electrical resource. In other words, it is the landing gear extension/retraction system 700 that uses the electrical resource.

This is different to (and may be in addition to) the arrangements of the first and second embodiments where the electrical resource is used to provide power to the control units 430, 440 themselves. The control units 430, 440 (depending on which control unit is responsible at the relevant time) provide control signals 437, 447 to control the actuation of the landing gear extension/retraction system 700. This uses electrical resource (from engines 510, 520) to the landing gear extension/retraction system 700.

This is shown schematically in FIG. 4 by arrows 437, 447 sent to the engines/resource 510, 520 and by arrows 512, 522 to the landing gear extension/retraction system 700. Alternatively, the control signals 437, 447 may be sent to the landing gear extension/retraction system 700 and the landing gear extension/retraction system 700 effectively then takes electrical resource from the appropriate engine 510, 520 (via the generator).

Figure 5:
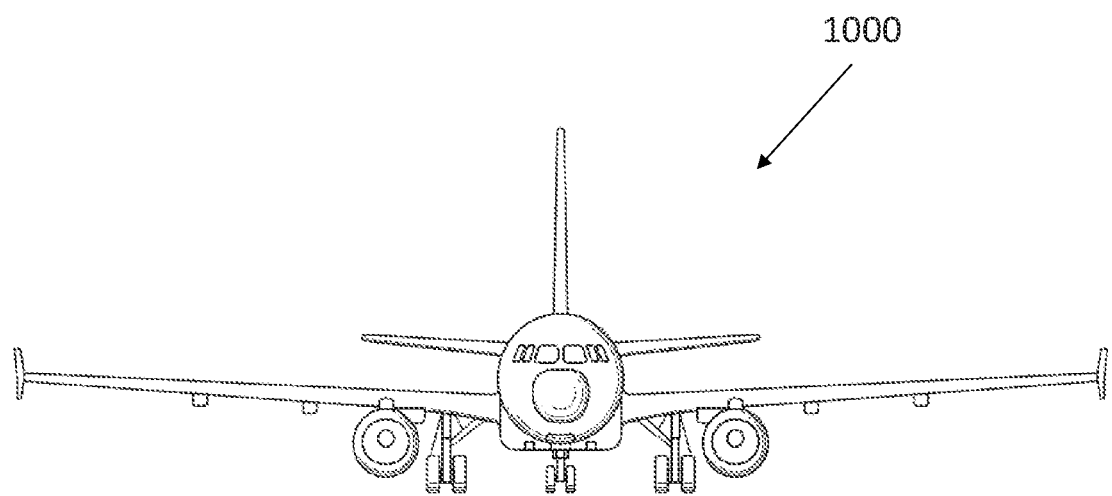
FIG. 5 shows a front view of an aircraft comprising the control system of any of the first to fourth embodiments.

FIG. 5 shows a front view of an aircraft 1000 comprising the control system of any of the first to fourth embodiments.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Any suitable shaft speed (e.g. of second or third shaft in the engine) may be used to assess whether or not there is a fault with an engine.

Any suitable algorithm may be used to assess whether or not there is a fault with an engine (for example, the algorithm could compare first and second shaft speeds within the same engine or use different percentage/absolute differences).

The engines 510, 520 may instead output a signal 513, 523 that provides a "fault" or "no fault" signal to the computer 600.

The switching mechanism (or mechanisms) may instead receive a "raw" shaft speed signal (or signals) and use these to assess whether or not there is an engine fault.

There may be more than two engines, control units etc.

There may be two or more (rather than one) FMGEC 600.

The control system may be used to control braking, steering or any other suitable system, rather than landing gear extension/retraction. In other words, the control units could be Braking and Steering Control Units (BSCUs), for example using direct electrical power resource from engines 510, 520 (via generators). Alternatively, or in addition, the brakes or steering system itself could use electrical power from engines 510, 520 (via generators).

The above embodiments are to be understood as illustrative examples of the invention. Equivalents and modifications not described above may also be employed without departing from the scope of the invention, which is defined in the accompanying claims.

It is to be understood that any feature described in relation to any one embodiment may be used alone, or in combination with other features described, and may also be used in combination with one or more features of any other of the embodiments, or any combination of any other of the embodiments.

It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

Although the invention has been described above mainly in the context of a fixed-wing aircraft application, it may also be advantageously applied to various other applications, including but not limited to applications on vehicles such as helicopters, drones, trains, automobiles and spacecraft.

The invention claimed is:

1. An aircraft control system for controlling actuation of an aircraft component, the system comprising a control assembly including:
    a first control unit configured to control actuation of the aircraft component during a first time period using an electrical resource from a first electrical resource device,
    a second control unit configured to control actuation of the aircraft component during a second time period separate from the first time period, and
    a switch mechanism configured to switch control of the actuation of the aircraft component between the first control unit and the second control unit,
    wherein the switch mechanism has a first electrical resource device status input configured to indicate a status of the first electrical resource device, and
    wherein the switch mechanism is configured to switch control, based on the first electrical resource device status input, from the first control unit to the second control unit during the first time period or from the second control unit to the first control unit during the second time period.

2. The aircraft control system as claimed in claim 1, wherein the first control system is configured to control actuation of at least one of: a landing gear system, a braking system, or a steering system.

3. The aircraft control system as claimed in claim 1, wherein the second control unit controls actuation of the aircraft component using an electrical resource from a second electrical resource device,
    wherein the switch mechanism includes a second electrical resource device status input configured to indicate a status of the second electrical resource device, and
    wherein the switch mechanism is configured to switch control between the first control unit and the second control unit based on the second electrical resource device status input.

4. The aircraft control system as claimed in claim 1, wherein the first control unit is configured to control actuation of the aircraft component using a direct electrical resource from the first electrical resource device.

5. The aircraft control system as claimed in claim 1, wherein the first control unit is configured to control actuation of the aircraft component using an indirect electrical resource from the first electrical resource device.

6. The aircraft control system as claimed in claim 1, wherein the first electrical resource device status input comprises a "fault" or a "no fault" indication.

7. The aircraft control system as claimed in claim 1, wherein the switch mechanism is part of the first control unit.

8. The aircraft control system as claimed in claim 1, further comprising a second switch mechanism included in the second control unit.

9. The aircraft control system as claimed in claim 1, wherein the switch mechanism is configured to switch control between the first control unit and the second control unit periodically due to repeating of the first time period and the second time period.

10. An aircraft or aircraft assembly comprising the aircraft control system of claim 1.

11. The aircraft or aircraft assembly as claimed in claim 10, wherein the aircraft or the aircraft assembly further comprises the aircraft component and the first electrical resource device.

12. The aircraft or aircraft assembly as claimed in claim 11, wherein the aircraft or the aircraft assembly further comprises the second electrical resource device.

13. A method of controlling an aircraft component of an aircraft, the method comprising:
    monitoring a status of a first electrical resource device,
    a first control unit controlling actuation of the aircraft component during a first time period, wherein the first control unit uses an electrical resource from the first electrical resource device to actuate the aircraft component,
    a second control unit controlling actuation of the aircraft component during a second time period separate from the first time period, and based upon a status of the first electrical resource device, switching control of the actuation of the aircraft component from the first control unit to a second control unit during the first time period or switching control of the aircraft component from the second control unit to the first control unit during the second time period.

14. The method as claimed in claim 13, further comprising the second control unit controlling actuation of the aircraft component using an electrical resource from a second electrical resource device.

15. The method as claimed in claim 13, wherein the status of the first electrical resource device comprises a fault indication or a no-fault indication.

16. The method as claimed in claim 15, wherein the fault indication is provided prior to the electrical resource from the first electrical resource device becoming unavailable.

17. The method as claimed in claim 13, wherein the method includes switching control between the first control unit and the second control unit periodically due to repeating of first period and the second period.

18. The method as in claim 13, wherein the first electrical resource device is a first aircraft engine, and the aircraft component is at least one of a landing gear bay door, landing gear extension and retraction mechanism, a wheel braking system or a wheel steering system.

19. A landing gear control system for controlling actuation of a landing gear system of an aircraft, the landing gear control system comprising a control assembly including:

a first control unit configured to control actuation of a landing gear component of the landing gear during a first period, wherein the first control unit directs electrical energy generated by a first aircraft engine to the landing gear component, a second control unit configured to control actuation of the landing gear component during a second period separate from the first period, wherein the second control unit directs electrical energy generated by a second aircraft engine to the landing gear component, a switch mechanism configured to switch authority for controlling the landing gear component from the first control unit to the second control unit upon expiration of the first period and from the second control unit to the first control unit upon expiration of the second period, wherein the first and second periods are sequential and repeat, wherein the switch mechanism has an aircraft engine status input configured to indicate a status of at least the first aircraft engine, and wherein the switch mechanism is configured to switch the authority between the first and second control units in response to a change in the status of the at least first aircraft engine and regardless of whether the switching done in the first period or the second period.

* * * * *